US012731569B2

(12) United States Patent
Candelore

(10) Patent No.: US 12,731,569 B2
(45) Date of Patent: Sep. 8, 2026

(54) REDUCTION OF NOISE CANCELLATION SIGNALS BASED ON SENSOR INPUT

(71) Applicant: Sony Group Corporation, Tokyo (JP)

(72) Inventor: Brant Candelore, Poway, CA (US)

(73) Assignee: Sony Group Corporation, Tokyo (JP)

( * ) Notice: Subject to any disclaimer, the term of this patent is extended or adjusted under 35 U.S.C. 154(b) by 151 days.

(21) Appl. No.: 18/745,960

(22) Filed: Jun. 17, 2024

(65) Prior Publication Data

US 2025/0384863 A1 Dec. 18, 2025

(51) Int. Cl.
*G10K 11/16* (2006.01)
*G06F 3/16* (2006.01)

(52) U.S. Cl.
CPC .............. *G10K 11/16* (2013.01); *G06F 3/165* (2013.01)

(58) Field of Classification Search
CPC .. G10K 11/16; G10K 11/178; G10K 11/1783; G10K 11/17837; G10K 11/1787; G10K 11/17885; G10K 2210/108–1081; G10K 2210/3056; G10K 2210/3011; G10K 2210/30351; G06F 3/165; H04R 1/1083; H04R 2460/01
See application file for complete search history.

(56) References Cited

U.S. PATENT DOCUMENTS 10,102,843 B1 10/2018 Le et al.
11,080,981 B1 * 8/2021 Gochoo ................. G08B 21/02
11,202,140 B2 12/2021 Kulavik et al.
11,949,948 B2 4/2024 Candelore
2011/0096939 A1 * 4/2011 Ichimura ................. G10L 25/84 381/74
2014/0079235 A1 * 3/2014 Lyons ............. G10K 11/17873 381/71.6
2017/0257072 A1 * 9/2017 Mehta ...................... H03G 3/32
2021/0090545 A1 * 3/2021 Clark ..................... H04N 23/20
2021/0209365 A1 * 7/2021 Scott, II ................ G10L 13/027
(Continued)

OTHER PUBLICATIONS

"How to enable or disable the active noise cancellation feature", HYAWEI. No date available. Retrieved from https://consumer.huawei.com/en/support/content/en-us00759709/.
(Continued)

*Primary Examiner* — Mark Fischer
(74) *Attorney, Agent, or Firm* — John M. Rogitz; John L. Rogitz

(57) ABSTRACT

In one aspect, an apparatus includes a processor system and storage accessible to the processor system. The storage includes instructions executable by the processor system to present, at a device, audio as well as noise cancellation signals and ambient sound. The instructions are also executable to receive input from one or more sensors and, based on the input, reduce the amplitude of the noise cancellation signals (and even boost ambient sound). Different triggers may cause reduction of the noise cancellation signals based on the sensor input. For example, the trigger may be a source of sound other than the user and other than the user's audio output device being within a threshold distance to the device. The trigger may also be the source of sound being a whitelisted source of sound. As other examples, the trigger may be the source of sound indicating a name of the user and/or directing speech toward the user.

20 Claims, 4 Drawing Sheets

(56) References Cited

U.S. PATENT DOCUMENTS

| | | | | |
|---|---|---|---|---|
| 2021/0397407 | A1 * | 12/2021 | Eubank .................. | G06F 3/013 |
| 2024/0195916 | A1 * | 6/2024 | Schiøler .................. | H04R 3/00 |

OTHER PUBLICATIONS

"Define ambient sound", Bing search, May 30, 2024.
Candelore, Brant, "Playback Control Based on Image Capture", file history of related issued U.S. Pat. No. 11,949,948, issued Apr. 2, 2024.
"Sony WH-1000XM4 | Using the Speak-to-Chat Feature." *YouTube*, uploaded by Sony Connect, [https://www.youtube.com/watch?v=qN2rlDShlG0](https://www.youtube.com/watch?v=qN2rIDShIG0).
Welch, Chris. "How to Use the Helpful Speak to Chat Feature on Sony Headphones and Earbuds." *The Verge*, May 23, 2022, **[https://www.theverge.com/23138047/sony-speak-to-chat-how-to-use-headphones-earbuds-feature].

* cited by examiner

REDUCTION OF NOISE CANCELLATION SIGNALS BASED ON SENSOR INPUT

FIELD

This disclosure relates to technical advances that are necessarily rooted in computer technology. More particularly, this disclosure relates to reduction of noise cancellation signals based on sensor input during audio playback.

BACKGROUND

As recognized herein, noise cancellation can be used while playing other audio to cancel out environmental sound that would otherwise reach the user's ear and interfere with the user's ability to hear the audio. Noise cancellation allows users to hear audio at a much lower volume then would otherwise be possible. However, as also recognized herein, sometimes noise cancellation works too well when a user might want or need to hear certain things in his or her environment for safety and other reasons. There are currently no adequate solutions to the foregoing computer-related, technological problem.

SUMMARY

Accordingly, in one aspect an apparatus includes a processor system and storage accessible to the processor system. The storage includes instructions executable by the processor system to concurrently present, at a device, audio and noise cancellation signals different from the audio. The instructions are also executable to receive input from one or more sensors and, based on the input, determine that a source of sound is within a threshold distance to the device. Based on the determination, the instructions are executable to reduce the amplitude of the noise cancellation signals while continuing to present, pause or mute the audio. And if noise cancellation is shut-off, to allow some environmental sound that is known as "ambient sound". Muting of the audio might be desirable, for example, for content that cannot be paused such as over-the-air (OTA) broadcasts.

In one example implementation, the instructions may be executable to reduce the amplitude by ceasing to present the noise cancellation signals (e.g., stop presenting them, mute them, pause presenting them, reducing their amplitude to zero, etc.). In another example implementation, the instructions may be executable to reduce the amplitude by reducing the amplitude from a first level to a second level lower than the first level, where the second level may still be higher than zero. Still further, if desired the instructions may be executable to, based on the determination, stop, pause, and/or mute the audio.

In one example embodiment, the one or more sensors may include at least first and second microphones on the device. So according to this example embodiment, the determination may be made based on triangulation of the source of sound using input from the first and second microphones. If desired, the apparatus may even include the device and the first and second microphones themselves.

Also in an example embodiment, the one or more sensors may include a wireless signal transceiver. Here the determination may be made based on input from the wireless signal transceiver indicating the source of sound within the threshold distance.

Additionally, in some instances the instructions may be executable to identify the source of sound as a whitelisted source of sound and, based on both the determination and the identification, reduce the amplitude of the noise cancellation signals (e.g., while continuing to present, pause or mute the audio while allowing no or various levels of ambient sound). In one specific instance, the instructions may even be executable to identify the source of sound as a whitelisted source of sound based on execution of voice recognition to determine that the source of sound is a predetermined person for whom the amplitude of the noise cancellation signals is to be reduced.

Additionally, in some non-limiting examples the instructions may be executable to identify the source of sound as indicating a name of a user of the device. Based on both the determination and the identification, the instructions may then be executable to reduce the amplitude of the noise cancellation signals (e.g., while continuing to present, pause or mute the audio and various levels of ambient sound).

Additionally or alternatively, in various examples the instructions may be executable to identify, using natural language processing, the source of sound as directing speech toward a user of the device. So here, based on both the determination and the identification, the instructions may then be executable to reduce the amplitude of the noise cancellation signals (e.g., while continuing to present, pause or mute the audio).

In another aspect, a method includes presenting audio at a device and receiving input from one or more sensors. Based on the input, the method includes reducing the volume of the audio and/or reducing the amplitude of noise cancellation signals being presented concurrently with the audio (e.g., while continuing to present, pause or mute the audio).

In certain examples, the method may also include determining, based on the input, that a source of sound is within a threshold distance to the device. Based on the determination, the method may then include reducing the amplitude of the noise cancellation signals (e.g., while continuing to present, pause or mute the audio).

Additionally or alternatively, in certain examples the method may include triangulating a source of sound based on the input. Here, based on the triangulation of the source of sound, the method may then include reducing the amplitude of the noise cancellation signals (e.g., while continuing to present, pause or mute the audio).

As another example, the method may include identifying, based on the input, a source of sound as a whitelisted source of sound. Based on the identification, the method may then include reducing the amplitude of the noise cancellation signals while continuing to present the audio.

As yet another example, in some cases the method may include, based on the input, identifying a name of a user of the device as being spoken. Based on the identification, the method may then include reducing the amplitude of the noise cancellation signals (e.g., while continuing to present or pausing/muting the audio).

In still another aspect, at least one computer readable storage medium (CRSM) that is not a transitory signal includes instructions executable by a processor system to present, at a device, audio and noise cancellation signals different from the audio. The instructions are also executable to receive input from one or more sensors and, based on the input, reduce the amplitude of the noise cancellation signals.

Thus, in certain examples the instructions may be executable to determine, based on the input, that a source of sound is within a threshold distance to the device. Then based on the determination, the instructions may be executable to reduce the amplitude of the noise cancellation signals.

Additionally or alternatively, in some examples the instructions may be executable to triangulate a source of sound based on the input. Based on the triangulation of the source of sound, the instructions may then be executable to reduce the amplitude of the noise cancellation signals.

Also in some instances, the instructions may be executable to identify, based on the input, a source of sound as a preapproved source of sound for which the noise cancellation signals are to be reduced (and for which the audio may also be reduced). Based on the identification, the instructions may then be executable to reduce the amplitude of the noise cancellation signals (e.g., and even the volume of the audio).

Additionally, if desired the instructions may be executable to, based on the input, identify a name of a user of the device as being spoken by a person different from the user. Based on the identification, the instructions may then be executable to reduce the amplitude of the noise cancellation signals (and even the volume of the audio).

The details of the present application, both as to its structure and operation, can best be understood in reference to the accompanying drawings, in which like reference numerals refer to like parts, and in which:

DETAILED DESCRIPTION

Figure 1:
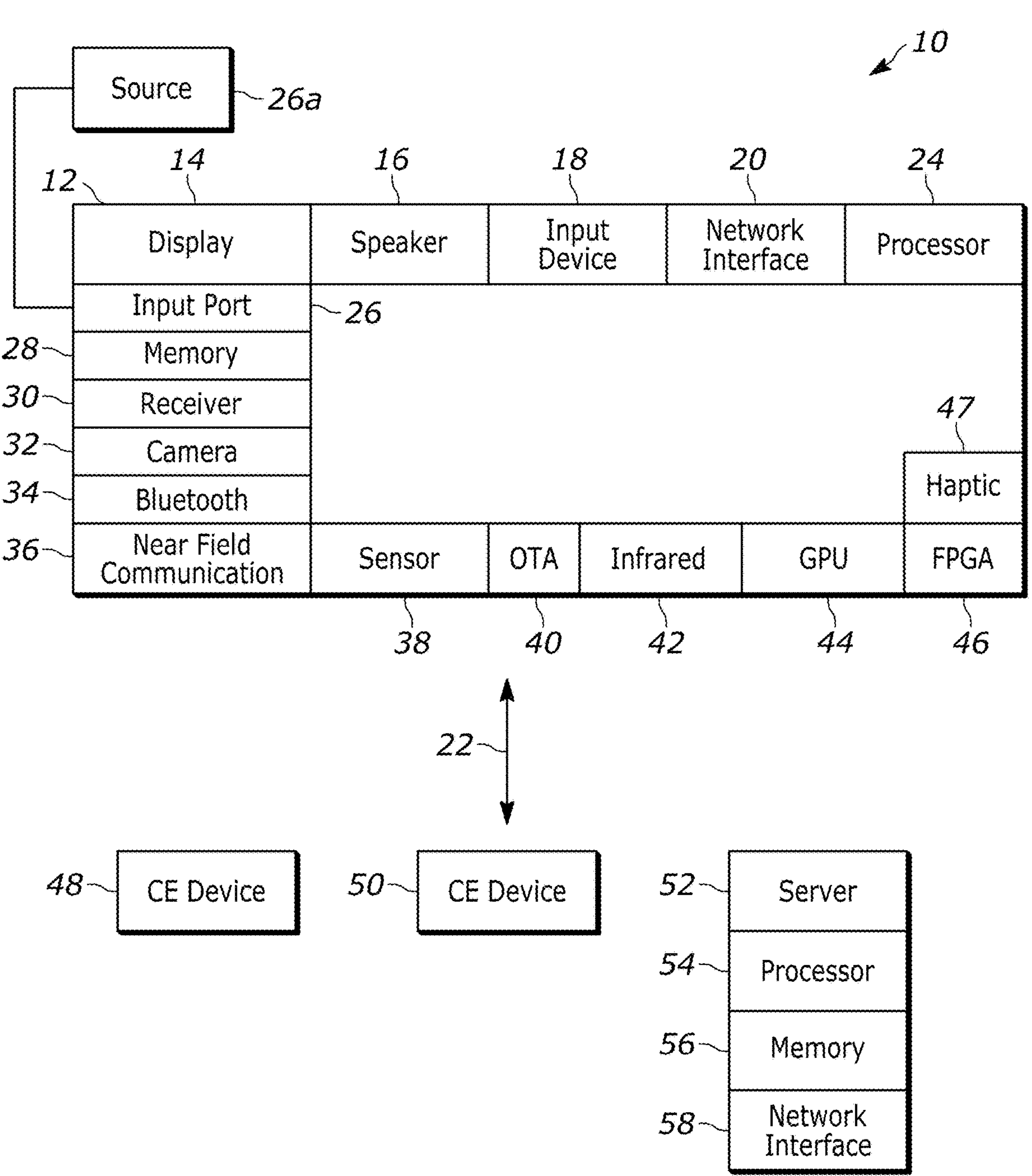
FIG. 1 is a block diagram of an example computing system consistent with present principles.

Among other things, disclosed below are systems and methods for selectively disabling noise cancellation to enable speech with someone nearby. Additionally or alternatively, audio and/or ambient sound that is picked up by microphones and provided to a listener through the device's speakers may also be selectively disabled to enable speech with someone nearby.

Accordingly, in one example implementation the hearable can be programmed using Sony's Connect application ("app") to go into a special mode that will allow noise cancellation, presentation of ambient sound, and/or audio playback to be momentarily disabled to allow someone nearby to talk to the wearer of the hearable. In terms of ambient sound in particular, present principles recognize that ambient sound in some non-limiting examples may get picked up by device microphones and actively sent to (and even amplified by) the device's speakers. Accordingly, in some non-limiting instances, noise cancellation may be completely shut off responsive to a trigger as discussed below before levels of ambient sound can be introduced through the speakers for a listener to hear someone speaking to them nearby.

With the foregoing in mind, it is to be generally understood that this disclosure relates to aspects of consumer electronics (CE) devices and other types of client devices and servers. Thus, devices herein may include server and client components which may be connected over a network such that data may be exchanged between the client and server components. The client components may include one or more computing devices including mobile smart phones, smart watches and other mobile devices, wearable devices, game consoles, extended reality (XR) headsets such as virtual reality (VR) headsets and augmented reality (AR) headsets, display devices such as televisions (e.g., smart TVs, Internet-enabled TVs), personal computers such as laptops, desktop, and tablet computers, and still other types of devices. These client devices may operate with a variety of operating environments. For example, a client device consistent with present principles may employ, as examples, Linux and Unix operating systems, operating systems from Microsoft, or operating systems from Apple or Google. These operating environments may be used to execute one or more browsing programs, such as a browser made by Microsoft, Apple, Google, or Mozilla. The operating environments may also be used to execute other Internet-networked dedicated mobile applications that can access websites hosted by the Internet servers over a network such as the Internet, a local intranet, or a virtual private network.

Servers and/or gateways may be used that may include one or more processors executing instructions that configure the servers to receive and transmit data over a network such as the Internet. Or a client and server can be connected over a local intranet or a virtual private network. A server or controller may be instantiated by a personal computer, mobile device, rack or blade server, etc.

As indicated above, information may be exchanged over a network between client devices and servers. To this end and for security, servers and/or clients can include firewalls, load balancers, temporary storages, and proxies, and other network infrastructure for reliability and security.

As used herein, instructions may refer to computer-implemented steps for processing information in the system. Instructions can be implemented in software, firmware or hardware, or combinations thereof and include any type of programmed steps undertaken by components of the system.

A processor may be any single- or multi-chip processor that can execute logic by means of various lines such as address lines, data lines, and control lines and registers and shift registers. Moreover, any logical blocks, modules, and circuits described below can be implemented or performed with a processor/processor system such as a central processing unit (CPU), a digital signal processor (DSP), a field programmable gate array (FPGA) or other programmable logic device, an application specific integrated circuit (ASIC), discrete gate or transistor logic, discrete hardware components, or any combination thereof designed to perform the functions described herein. A processor can be implemented by a controller or state machine or a combination of computing devices.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

The functions and methods described below, when implemented in software, can be written in an appropriate language such as but not limited to C# or C++, and can be stored on or transmitted from a computer-readable storage medium such as a hard disk drive (HDD) or solid state drive (SSD), random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

In an example, a processor/processor system can access information over its input lines from data storage, such as a computer readable storage medium as referenced above, and/or the processor system can access information wirelessly from an Internet server by activating a wireless transceiver to send and receive data. Data typically is converted from analog signals to digital by circuitry between the antenna and the registers of the processor system when being received and from digital to analog when being transmitted. The processor system then processes the data through its shift registers to output calculated data on output lines, for presentation of the calculated data on the device, etc.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

The term "a" or "an" in reference to an entity refers to one or more of that entity. As such, the terms "a" or "an", "one or more", and "at least one" can be used interchangeably herein.

The term "circuit" or "circuitry" may be used in the summary, description, and/or claims. The term "circuitry" includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Referring now to FIG. 1, an example system 10 is shown, which may include one or more of the example devices mentioned above and described further below in accordance with present principles. The first of the example devices included in the system 10 is a consumer electronics (CE) device 12. The CE device 12 may be a computerized Internet enabled ("smart") phone, a tablet computer, a laptop/notebook computer, a desktop computer, a head-mounted device (HMD) and/or headset such as smart glasses or AR or VR headset, another wearable computerized device, etc. Regardless, it is to be understood that the CE device 12 is configured to undertake present principles (e.g., communicate with other CE devices and servers to undertake present principles, execute the logic described herein, and perform other functions and/or operations described herein).

Accordingly, to undertake such principles the CE device 12 can be established by some, or all, of the components shown. For example, the CE device 12 can include one or more touch-enabled displays 14 that may be implemented by a high definition or ultra-high definition "4K" or higher flat screens. The touch-enabled display(s) 14 may include, for example, a capacitive or resistive touch sensing layer with a grid of electrodes for touch sensing consistent with present principles (e.g., to provide input to the GUIs discussed below).

The CE device 12 may also include an analog audio output port 15 to drive one or more external speakers or headphones, and may include one or more internal speakers 16 for outputting audio in accordance with present principles. The CE device 12 may also include at least one additional input device 18 such as one or more audio receiver/microphones, e.g., for detecting sound and entering audible commands to the CE device 12 to control the CE device 12. The example CE device 12 may also include one or more wired or wireless network interfaces 20 for communication over at least one network 22 such as the Internet, a WAN, a LAN, etc. under control of one or more processors of a processor system 24, such as a CPU or other processor mentioned above. Thus, the interface 20 may be, without limitation, a Wi-Fi transceiver and/or wireless telephony transceiver for communicating over a wireless cellular network (e.g., operated by Verizon, T-Mobile, or AT&T), both of which are examples of a wireless computer network interface. The network interface 20 may also be a wired or wireless modem or router or other suitable network interface.

It is to be understood that the processor system 24 may include one or more processors acting independently or in concert with each other to execute an algorithm, whether those processors are in one device or more than one device. The processor system 24 controls the CE device 12 to undertake present principles, including the other elements of the CE device 12 described herein such as controlling the display 14 to present images thereon and receiving input therefrom.

In addition to the foregoing, the CE device 12 may also include one or more input and/or output ports 26 such as a high-definition multimedia interface (HDMI) port or a universal serial bus (USB) port to physically connect to another CE device, and/or a headphone port to connect headphones to the CE device 12 for presentation of audio from the CE device 12 through the headphones. For example, the input port 26 may be connected wired or wirelessly to a cable or satellite source **26*a* of audio video content. Thus, the source 26*a* may be a separate or integrated set top box, or a satellite receiver. Or the source 26*a*** may be a game console or disk player containing content.

The CE device 12 may further include one or more non-transitory computer memories/computer-readable storage media 28 such as disk-based or solid-state storage that are not transitory signals. In some cases, the media 28 may be embodied in the chassis/housing of the CE device 12 (e.g., as standalone devices) or as removable memory media or the below-described server(s).

Also, in some embodiments, the CE device 12 can include a position or location receiver such as but not limited to a cell phone transceiver, global positioning system (GPS) transceiver, and/or altimeter 30. This transceiver may therefore be configured to receive geographic position information from a satellite or cellphone base station (and/or determine an altitude at which the CE device 12 is disposed) and then provide the information to the processor system 24. However, it is to be understood that another suitable position receiver other than a GPS receiver, cell phone transceiver, and/or altimeter may be used consistent with present principles to determine the location of the CE device 12.

Continuing the description of the CE device 12, in some embodiments the CE device 12 may include one or more cameras 32 that may be thermal imaging cameras, digital cameras such as webcams, infrared (IR) sensors, and/or other types of cameras or other optical sensors integrated into the CE device 12 and controllable by the processor system 24 to gather pictures/images and/or video consistent with present principles. Also included on the CE device 12 may be a Bluetooth® transceiver 34 and/or other Near Field Communication (NFC) element 36 for communication with other devices using respective Bluetooth and/or NFC wireless technologies/communication standards. An example NFC element can be a radio frequency identification (RFID) element.

Further still, the CE device 12 may include one or more auxiliary sensors 38 that provide input to the processor system 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

Other sensor examples include a motion sensor such as an accelerometer, gyroscope, magnetometer, a speed and/or cadence sensor, an event-based sensor, a gesture sensor (e.g., for sensing gesture command), etc. In one specific example, the sensor 38 thus may be implemented as an inertial measurement unit (IMU) with motion sensors including individual accelerometers, gyroscopes, and magnetometers, and/or other components of that include a combination of accelerometers, gyroscopes, and magnetometers, to determine the location and orientation of the CE device 12 in three dimensions. A gyroscope consistent with present principles may sense and/or measure the orientation of the CE device 12 and provide related input to the processor system 24, an accelerometer consistent with present principles may sense acceleration and/or movement of the CE device 12 and provide related input to the processor system 24, and a magnetometer consistent with present principles may sense and/or measure directional movement of the CE device 12 and provide related input to the processor 122.

The CE device 12 may also include an over-the-air TV broadcast port 40 for receiving OTA TV broadcasts and providing the input to the processor system 24. In addition to the foregoing, it is noted that the CE device 12 may also include an IR transceiver 42 such as an IR data association (IRDA) device. A battery (not shown) may be provided for powering the CE device 12, as may a kinetic energy harvester that may turn kinetic energy into power to charge the battery and/or power the CE device 12. The CE device 12 may also be powered by an alternating current power supply. A graphics processing unit (GPU) 44 and field programmable gated array 46 also may be included.

One or more haptics/vibration generators 47 may also be provided for generating tactile signals/vibrations that can be sensed by a person holding or in contact with the device. The haptics generators 47 may thus vibrate all or part of the CE device 12 using an electric motor connected to an off-center and/or off-balanced weight via the motor's rotatable shaft so that the shaft may rotate under control of the motor (which in turn may be controlled by a processor such as the processor system 24) to create vibration of various frequencies and/or amplitudes as well as force simulations in various directions.

In addition to the CE device 12, the system 10 may include one or more other CE devices/types, which may include some or all of the components mentioned above in relation to the CE device 12. In one example, a second CE device 48 may be established by an Internet of things (IoT) device, a smartphone, a laptop computer, etc. A third CE device 50 is also shown in FIG. 1 and may include similar components as the other CE devices. Thus, in one example, the CE device 50 may be configured as a head-mounted display (HMD) that may include a heads-up transparent or non-transparent display for respectively presenting extended reality (XR) content such as AR content, VR, content, and/or mixed reality (MR) content. The XR content itself might include, as an example, one or more of the GUIs described below, presented stereoscopically. The HMD may be configured as a glasses-type display, or as goggle-type and/or VR-type display vended by various computer hardware manufacturers such as Apple, Oculus, Meta, etc.

In the example shown, only three CE devices are shown, it being understood that fewer or more devices may be used. A device herein may implement some or all of the components shown for the CE device 12. Any of the components shown in the following figures may incorporate some or all of the components shown in the case of the CE device 12.

Now in reference to the afore-mentioned at least one server 52, it includes at least one server processor/processor system 54 and at least one tangible computer readable storage medium 56 such as disk-based or solid-state storage. The server 52 also includes at least one network interface 58 that, under control of the server processor 54, allows for communication with other illustrated devices over the network 22 (e.g., the Internet), and indeed may facilitate communication between the server 52 and any other servers/client devices as described herein. Note that the network interface 58 may be, e.g., a wired or wireless modem or router, Wi-Fi or Ethernet transceiver, or other appropriate interface such as, e.g., a wireless telephony transceiver.

Accordingly, in some embodiments the server 52 may be an Internet server or an entire server "farm" of multiple services. If desired, the server 52 may include/perform "cloud" functions such that the devices of the system 10 may access a "cloud" environment via the server 52 in certain example embodiments. Additionally or alternatively, the server 52 may be implemented by one or more computers in the same room as the other devices shown, or nearby.

The components shown in the following figures may include some or all components shown herein. Any user interfaces (UI) described herein may be consolidated and/or expanded, and UI elements may be mixed and matched between UIs.

Figure 2:
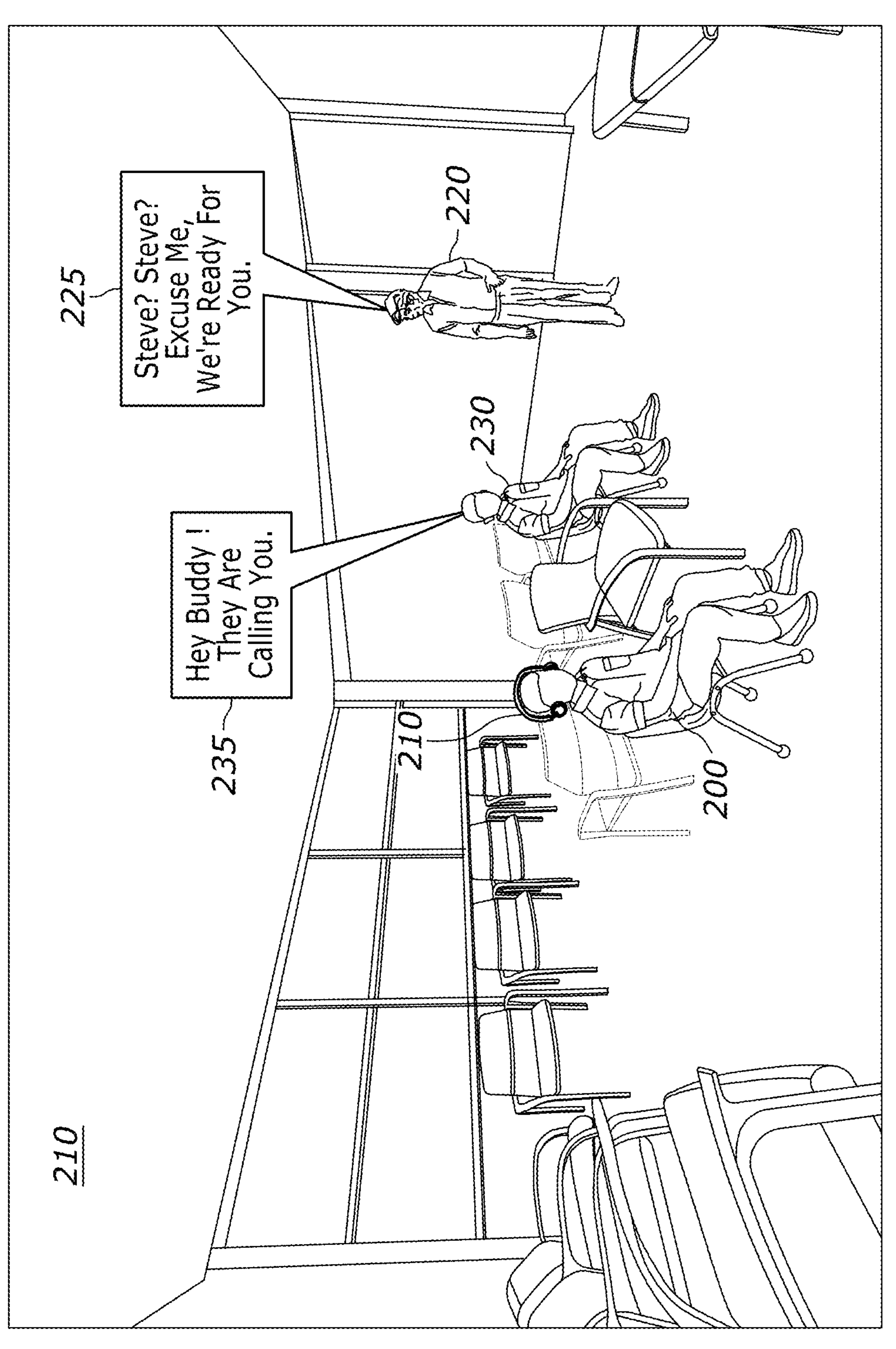
FIG. 2 is an example illustration of a user that is using noise cancellation headphones while different people try to speak to the user to demonstrate present principles.

With the foregoing in mind, reference is now made to FIG. 2. Suppose a user 200 is wearing over-the-ear, closed-back headphones 205 while sitting in a chair in a waiting room 210 of a physician's office. Per this example, assume the headphones 205 are playing back audio such as a podcast, audio livestream, and/or music through the left and right speakers of the headphones 205. Also assume noise cancellation signals are being concurrently presented through the same speakers to cancel ambient noise and other sound from within the waiting room 210 so that the user 200 can hear the audio without distraction. The noise cancellation signals themselves may be generated as anti-waves to sound waves that are detected by respective microphones on the left and right ear cups of the headphones 205 themselves to thus cancel the sound at the user's ears. Active noise cancellation algorithms may therefore be used.

Also suppose that the user's scheduled appointment time with the physician has arrived and, as such, an assistant 220 has entered the waiting room 210 to call the user 200 back to an examination room for the user's appointment. As such, the assistant 220 might say, "Steve? Steve?" as represented by speech bubble 225. In some examples, the headphones 210 (and/or a remote server in communication with the headphones 210) may identify the assistant 220 as indicating the name of the user of the headphones 210 (Steve) using its microphone(s) and speech recognition software. Responsive to that, the headphones 210 may reduce the amplitude of the noise cancellation signals while continuing to present (or pause) the audio of the podcast, livestream, or music so that the user 200 (Steve) can hear his name being called. In some examples, the headphones 210 may also reduce the amplitude of the audio itself for the same purpose.

However, in some examples the speaking of the user's name may not be a trigger for noise cancellation reduction, and/or a source of sound might also be required by the headphones 210 to be within a threshold distance of the headphones 210 to trigger the reduction in noise cancellation (but where the assistant 220 is not within that threshold distance according to the example of FIG. 2). So here, the headphones 210 might not reduce the noise cancellation signals' amplitude based on the utterance of Steve's name alone. Therefore, according to these examples, after noticing that no one named "Steve" has yet to come forward, the assistant 220 might already know Steve and as, as such, direct other speech to the user 200 by saying, "Excuse me sir, we're ready for you."

Accordingly, if the headphones 210 have been configured with a trigger to reduce the amplitude of the noise cancellation signals based on the source of sound directing speech toward the user 210 (even if the source of sound does not directly annunciate the user's name), the headphones 210 may still reduce the amplitude of the noise cancellation signals responsive to that trigger. So in the present instance, if the headphones 210 detect via its microphone(s) that the assistant 220 has directed speech toward the user 210, the headphones 210 may reduce the amplitude of the noise cancellation signals.

The headphones 210 may determine that the speech is directed toward the user 200 a number of ways. In one example, the headphones 210 may use natural language processing to do so, including executing topic segmentation and natural language understanding in particular to determine that a context in the detected speech matches a context associated with the user.

Additionally or alternatively, plural microphones may be integrated into the headphones 210 as a microphone array and, in such an embodiment, the headphones 210 may execute beamforming using input from the microphone array to determine that the assistant's speech is directed directly toward the user 200 rather than in another direction. The headphones 210 might do so, for example, based on a signal strength threshold being met for the detected speech to determine that the speech is directed in the direction of the headphones 210. The signal strength threshold may be preconfigured by the headphone's manufacturer or a software developer, for example, based on empirical testing being done that indicates that a source of sound is directly emitting sound on axis toward a listener. The testing may be done by comparing the relative volume of the sound from the source to the volume of ambient noise, echoes/reflections of the speech itself, and other (unrelated) speech that might be detected by the headphones 210, where detected speech that is a threshold volume amount more than one or more of (or all of) those other sources of sound may satisfy the trigger for being speech directed on-axis to the user 200.

However, in examples where speech being directed at the user is not a trigger for noise cancellation reduction, and/or where the assistant 220 is not within a threshold distance of the headphones 210 to trigger the noise cancellation reduction, the headphones 210 might not reduce the noise cancellation signals' amplitude based on the speech directed toward the user 200. But there might still be other triggers that can be used by the headphones 210 to reduce the noise cancellation signals consistent with present principles. With this in mind, assume that another person 235 has noticed the assistant 220 trying to get the attention of the user 200. As such, the person 235 might say something like "Hey buddy, they're calling you," as represented by speech bubble 235.

The headphones 210 may detect this speech from the person 235 and, in response, determine whether the source of sound (person 235) is within a threshold distance to the headphones 210. The headphones 210 may do so a number of different ways alone or even in combination to increase device confidence in the distance determination. For example, the headphones 210 may have an infrared (IR) proximity sensor that can be used to determine a distance to the source of sound (e.g., once a direction toward the source of sound is determined using beamforming as set forth above). Additionally or alternatively, computer vision may be executed using images from a camera on the headphones 210 or otherwise in communication with the headphones to determine a distance between the headphones 210 and identified source of sound. If not integrated into the headphones 210, the camera might be another camera within the environment to which the headphones 210 are wirelessly connected, for example. A laser rangefinder may also be used to determine a distance to a source of sound.

Also, input from a wireless signal transceiver on the headphones 210 or connected/paired smart device may be used (e.g., Wi-Fi or Bluetooth transceiver), where a received signal strength indicator (RSSI) algorithm may be executed on signals received at the wireless signal transceiver as emitted by another device associated with the source of sound itself to determine the distance to the source of sound (e.g., and hence determine whether the source of sound is within the threshold distance by assuming the actual distance to the other device as determined via RSSI is the same as to the distance to the source of sound). This may be combined with voice recognition, for example, so that a voice of a particular user may be identified and then RSSI may be executed to determine whether the user's own device is within the threshold distance (and hence whether the voice-recognized user himself/herself is within the threshold distance).

As another example, triangulation may be performed using input from both a first microphone on the left side of the headphones 210 and a second microphone on the right side of the headphones 210 to determine the distance to the person 230 and hence whether the person 230 is within the threshold distance. If the headphones 210 have three microphones, or if a third microphone from a CE audio source device 50 such a mobile phone can be used, triangulation may be extended into multilateration and/or trilateration to determine the location (and hence distance to) the source of sound in three dimensional (3D) space. What's more, in addition to or in lieu of triangulation, input from the microphones may be used to execute an interaural level difference (ILD) algorithm and/or and interaural time difference (ITD) algorithm. With ILD, the user's head may cast a shadow on sounds originating from one side of the head. This results in a change in intensity level at the opposite ear which can be used for sound localization (and hence a distance determination). With ITD, sounds from one side of the user's head may be determined to arrive later at the opposite ear due to the time it takes for sound waves to travel around the head, and the time delay can also be used for sound localization (and hence a distance determination).

Then responsive to determining the person 235 (source of sound) as being within the threshold distance, the headphones 210 may reduce the amplitude of the noise cancellation signals while the speech from the person 235 continues. Then once the person 235 stops speaking, the amplitude of the noise cancellation signals and of the audio, if paused or muted, may be increased back to its previously level prior to the speech of the person 235.

Figure 3:
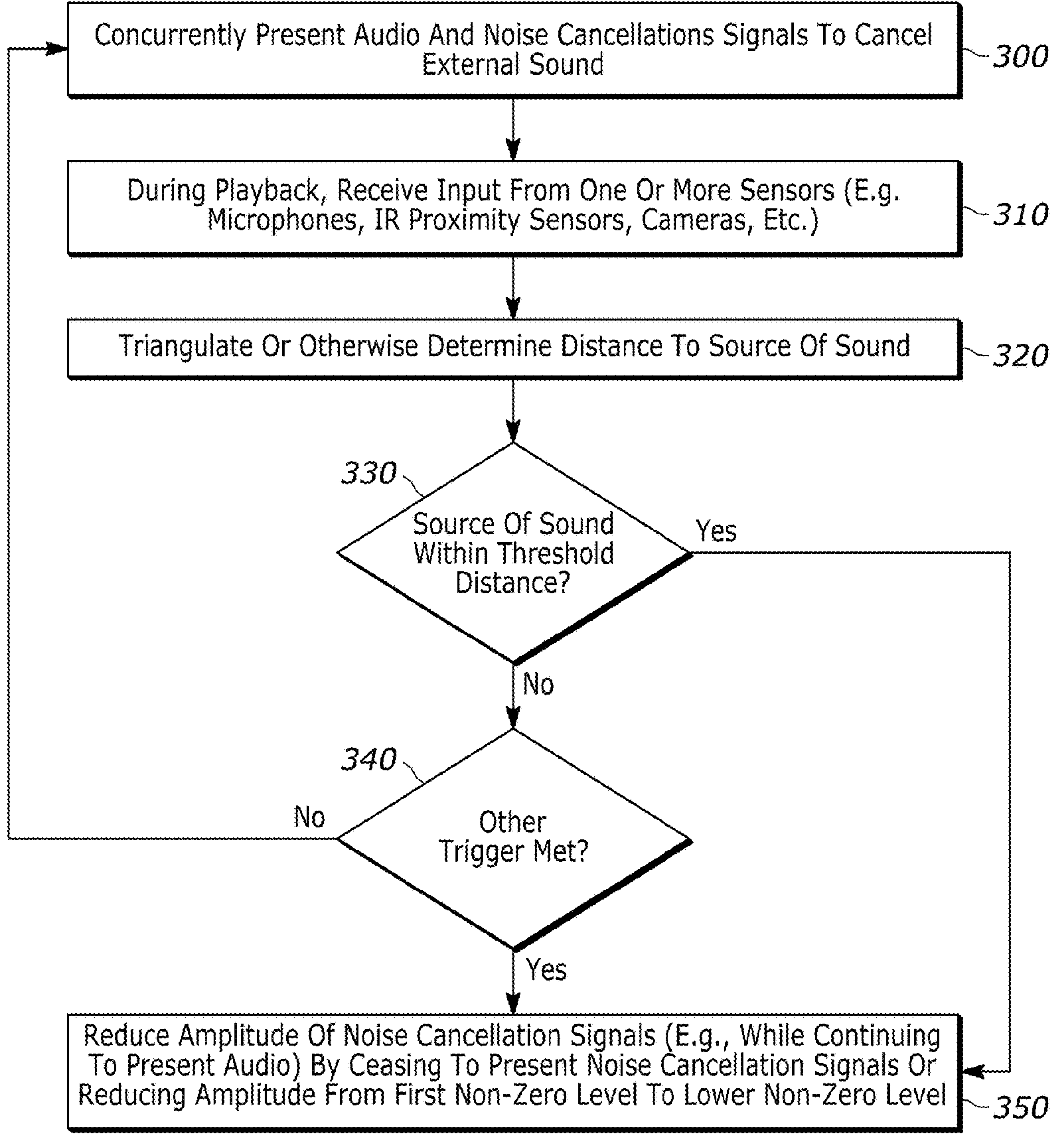
FIG. 3 illustrates example logic in example flow chart format that may be executed by an apparatus/processor system consistent with present principles.

With the foregoing in mind, reference is now made to FIG. 3. This figure shows example logic that may be executed by a processor system/apparatus embodied in one or more devices, such as the CE device 12, CE device 50, headphones 210, and/or server 52 alone or in any appropriate combination. So in some examples, the logic may be executed by a client device alone. In other examples, the logic may be executed by a client device and remotely-located server, where the client device offloads some or all of the logic to the server. The logic may be executed at the operating system level, by a media player app, and/or by another app in different example implementations. Note that while the logic of FIG. 3 is shown in flow chart format, other suitable logic may also be used.

Beginning at block 300, the apparatus may concurrently present, at an audio output device, audio and noise cancellation signals different from the audio. The audio output device may be any client device having speakers for producing audio, including hearing aids, Linbuds, headphones, shoulder speakers, earbuds, a mobile device such as a smartphone or tablet computer, a laptop computer, smart glasses, an AR/VR headset, and/or any other suitable client device including those mentioned above in reference to FIG. 1.

The audio itself that is produced by the output device may be audio from an audio file stored locally at the output device or streamed over the Internet or streamed from another local CE device that may be connected to the output device over Bluetooth or WI-FI, for example. Additionally or alternatively, in some specific examples the audio may be part of an audio video file such as a video (with audio) being streamed over the Internet or stored locally at the output device. Other types of audio are also encompassed by present principles.

As for the noise cancellation signals themselves, again note that they may be established by anti-waves that are sound waves in one hundred eighty degree opposite phase with sound detected at the audio output device itself, such as ambient sound and the speech of other people besides the user. Active noise cancellation algorithms may therefore be executed by a digital signal processor (DSP) or other processor in the headphones (or processor in communication with the headphones) to take sound detected by the output device's microphones and generate the noise cancellation signals for output by the speaker(s) on the output device itself (the same speakers presenting the audio or even different speakers dedicated to noise cancellation).

From block 300 the logic may then proceed to block 310. At block 310 and during playback/playout of the audio itself, the apparatus may receive input from one or more sensors. The sensors may include any of those described above in reference to FIG. 2, as well as others. Accordingly, the sensors may include IR proximity sensors, laser range finders, microphones/mike arrays, cameras, etc.

The logic may then proceed to block 320. Based on the input from the sensor(s), at block 320 the device may triangulate a source of sound that has been detected using the input from the first and second microphones to determine a distance from the audio output device to the source of sound. Additionally or alternatively but still at block 320, the apparatus may determine the distance between the output device and source of sound other ways based on sensor input, such as via computer vision where the sensor input includes images/video from a camera. Other ways of determining distance may also be used, such as using an IR proximity sensor according to the non-limiting example of FIG. 2.

Then with the distance determined, the logic may proceed to decision diamond 330 where the apparatus may determine whether the source of sound is within a threshold distance to the output device based on the determined distance. An affirmative determination may cause the logic to proceed to block 350 as will be described in a moment, but note first that responsive to a negative determination at diamond 330, the logic may instead proceed to decision diamond 340. Also note that diamond 340 may be reached in other examples by proceeding directly from block 310 where the distance threshold might not be used to reduce the amplitude of the noise cancellation signals (but where other triggers might still be used to do so). Or if the actual distance between the source of sound and output device cannot be determined for some reason, the logic may proceed from block 320 directly to diamond 340 to determine if one or more other triggers might be met for reducing the amplitude of the noise cancellation signals.

Describing decision diamond 340 itself, here the apparatus may make one or more other determinations based on the sensor input received at block 310. For example, at diamond 340 the device may execute voice recognition using microphone input received at block 310 to identify the source of sound as a whitelisted source of sound to then reduce the amplitude of the noise cancellation signals based on the source of sound being whitelisted (e.g., as indicated in a whitelist list or database accessible to the apparatus).

In addition to or in lieu of voice recognition, other ways of determining whether the source of sound is a whitelisted source of sound may also be used. For example, the apparatus may identify the source of sound other ways like using microphones on the audio output device and beamforming to correlate the determined bearing to the source of sound to another device with which the apparatus (e.g., output device) is already communicating via Bluetooth, Wi-Fi direct, cellular, etc. The apparatus may thus receive GPS coordinates from the other device to determine the other device is the source of sound based on the other device's GPS location matching/being correlated to the determined bearing itself, and then identify the whitelisted person as being associated with that other device based on an Internet protocol (IP) address, MAC address, unique user ID (UUID), etc. as transmitted by the other device to the apparatus. The IP address, MAC address, and/or UUID may therefore also be stored in and correlated to the whitelisted person in the aforementioned whitelist list or database.

As another example where camera input is being used, the apparatus may identify the whitelisted person as speaking using action recognition, and then execute facial recognition on that person using images from the camera to identify that the person is in fact whitelisted according to facial recognition data also stored in the database. Other ways for determining that the source of sound is a predetermined (preapproved/whitelisted) person for whom the amplitude of the noise cancellation signals is to be reduced may also be used.

Also note that whitelisted sources of sound may not be limited to just people. Certain animals like the user's dog or cat may be whitelisted sources of sound, as may other devices like an Internet of things (IoT) doorbell or even a digital assistant device like an Amazon Alexa, Google Assistant, etc.

Still in reference to diamond 340, the apparatus may make still other determinations related to whether a trigger has been met for reducing the amplitude of the noise cancellation signals, including those described above in reference to FIG. 2. Accordingly, as another example, the apparatus may identify the source of sound as indicating a name of a user of the output device and, based on that, reduce the amplitude of the noise cancellation signals. As yet another example, the apparatus may use natural language processing to identify the source of sound as directing speech toward a user of the device and, based on that, reduce the amplitude of the noise cancellation signals.

Additionally, note that in some examples, more than one trigger may be required to be met to increase device confidence beyond a threshold level of confidence (e.g., 75%) that the amplitude of the noise cancellation signals should be reduced before the apparatus actually does so. For example, the apparatus may require in one non-limiting example that the source of sound both be within the threshold distance and be identified as directing speech toward the user/output device. As another non-limiting example, the apparatus may require that the source of sound both verbally indicate the name of the user and direct the same or different speech toward the user/output device.

Responsive to the affirmative determination(s) at diamond 340 that one or more other triggers have been met, the logic may then move to block 350. Also note here that a negative determination at diamond 340 may instead cause the logic to proceed back to block 300 so that logic can continue from there.

Describing block 350 itself, note that at this block the apparatus may reduce the amplitude of the noise cancellation signals, reduce the volume of the audio that is being presented, and/or reduce the volume of ambient sound as sensed by a microphone and presented to the user through the speakers. The apparatus may reduce the amplitude by ceasing to present the noise cancellation signals altogether while the trigger continues to exist, or may reduce the amplitude by reducing the amplitude from a first level to a second level lower than the first level but still higher than zero so that some of the sound that would otherwise be canceled can still reach the ear of the user (but perhaps at a softer volume than had the apparatus stopped presenting the noise cancellation signals altogether). Likewise, reducing the volume of the audio and boosting the piped-in ambient sound may include reducing the audio volume to a lower non-zero level or by ceasing to present the audio altogether. Thus, in some specific instances, even if no noise cancellation is being performed, the presentation of the audio may be reduced and the ambient sound boosted responsive to the trigger(s).

What's more, note that in some examples the noise cancellation signals may be first noise cancellation signals that cancel one or more distinct sounds detected in the audio environment, such as the speech of a person that might subsequently direct speech to the user and/or speak the user's name. In this example, note that the apparatus may have already been presenting second noise cancellation signals different from the first noise cancellation signals (but still concurrently with the first noise cancellation signals). The second noise cancellation signals might be output to cancel out sound from other people that are speaking, other audio that is played out by another device, and/or even ambient sound detected in the audio environment. Accordingly, per this specific non-limiting implementation, the apparatus may reduce the amplitude of the first noise cancellation signals so the user of the output device can hear a person speaking to them while the apparatus continues to maintain the amplitude of the second noise cancellation signals at their previous level prior to detection of the trigger, helping to ensure that the user can hear the relevant source of sound even where other sound might be present in the audio environment and otherwise make it difficult for the user to hear the person speaking to them (e.g., if the amplitude of the second noise cancellation signals was also reduced).

Also at block 350 and responsive to the trigger(s) being met, the apparatus may continue to present the audio (different from the noise cancellation signals) at the output device while the (first) noise cancellation signals are reduced. As one example, the apparatus may continue to present the audio at a same volume level that was used for presentation of the audio prior to the trigger being met. As another example, the apparatus may reduce the volume of the audio to a lower non-zero level responsive to the trigger being met so that the user can more easily hear a person directing speech at them, for example. As yet another example, the apparatus may also cease presenting the audio altogether (e.g., stop presenting the audio or reduce volume to zero) responsive to the trigger(s) being met for the user to hear speech directed at them.

The apparatus may continue to maintain the reduced amplitude of the (first) noise cancellation signals (and even the volume of the audio itself) at block 350 until one or more preconditions are met. For example, the apparatus may continue to maintain the noise cancellation signals in reduced amplitude for a threshold amount of time that may be preset by the end-user or device manufacturer and, responsive to the threshold amount of time ending, revert back to block 300 to increase the noise cancellation signals' amplitude back to a higher level used prior to the trigger. Additionally or alternatively, the apparatus may continue to maintain the noise cancellation signals in reduced amplitude until the trigger(s) that caused the reduction no longer exist and, responsive to the condition(s) resulting in the trigger(s) no longer being met, revert back to block 300 to increase the noise cancellation signals' amplitude back to a higher level used prior to the trigger(s). For example, the apparatus may continue to maintain the noise cancellation signals in reduced amplitude so long as a source of sound continues to direct speech toward the user/output device, and/or until the source of sound goes outside the threshold distance from the output device.

Thus, responsive to either precondition in the paragraph immediately above, the apparatus may proceed back to block 300 where the apparatus may revert to outputting the (first) noise cancellation signals at the same amplitude that was used prior to the noise cancellation reduction. Additionally, if the volume of the audio itself was also reduced at block 350, the apparatus may, upon reverting to block 300, also output the audio again at the same (higher) volume level that was used prior to the audio volume reduction.

Figure 4:
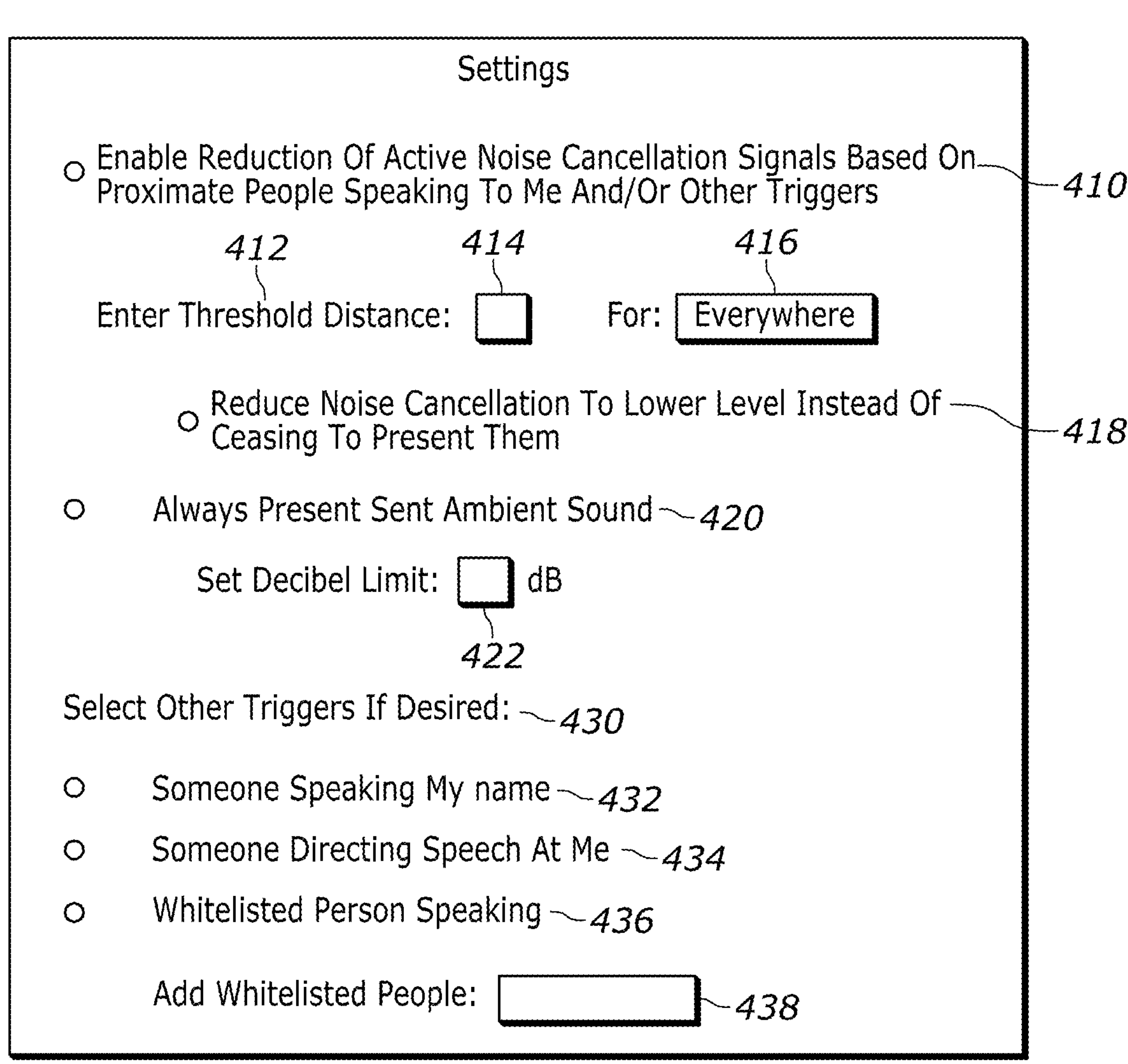
FIG. 4 shows an example settings graphical user interface (GUI) that may be presented on a display to configure one or more settings of an application and/or apparatus to operate consistent with present principles.

Continuing the detailed description in reference to FIG. 4, an example graphical user interface (GUI) 400 is shown. The GUI 400 may be presented on the display of an audio output device and/or on the display of a connected device, such as a smartphone display where the smartphone is connected to headphones (as the audio output device) via Bluetooth communication. The GUI 400 may be used to configure one or more settings related to noise cancellation consistent with present principles. Accordingly, in the example shown, each option or input box maybe selected by directing touch or cursor input to the respective option/associated radio button or input box itself.

As shown in FIG. 4, the GUI 400 may include a first option 410 that may be selectable a single time to set or enable the apparatus to, for multiple future instances, perform reduction of active noise cancellation signals based on proximate people speaking to the user and/or other triggers being met (including those discussed above). Therefore, selection of the option 410 may set or configure the apparatus to undertake one or more of the functions above described in reference to FIG. 2 and/or to execute the logic of FIG. 3.

The GUI 400 may also include a setting 412 with an input box 414 at which the end-user can specify a distance to use as the threshold distance from the user/audio output device as discussed above in reference to FIGS. 2 and 3. If desired, the setting 412 may also include an input box/drop-down menu 416 to select one or more locations/location types at which the threshold distance is to apply. In the present instance, the user has selected that the threshold distance should apply everywhere. However, present principles recognize that the threshold distance may only be applied only at certain locations and not elsewhere, and furthermore that different threshold distances may be applied for different locations/location types. Accordingly, the user may use the box/menu 416 to select a particular geolocation and/or location type for a number entered into box 414, and then repeat the process for a different location/type as desired. Location types may be broken down by public and private location types, or using a more granular location type such as airplane location type, store location type, personal residence location type, office building location type, etc.

As also shown in FIG. 4, the GUI 400 may include a sub-option 418 that may be selectable to set or enable the apparatus to reduce the noise cancellation signals to a lower non-zero level based on a trigger being met rather than ceasing to present them altogether (e.g., stopping presentation or reducing the amplitude to zero even if the noise cancellation signals are still being generated). Thus, should the sub-option 418 remain unselected or be deselected, the apparatus will be set to cease presenting the noise cancellation signals altogether.

FIG. 4 further shows that the GUI 400 may include an option 420 that may be selectable to set or configure the apparatus to always allow (not cancel) some level of ambient sound even when no trigger is met for reducing the noise cancellation signals themselves. A particular decibel limit for the amount of ambient sound that may be allowed over noise cancellation signals may even be specified via input box 422. Thus, should a user desire that some level of ambient noise still be allowed to the user's ears without being canceled (even when no trigger is met and noise is being canceled as it otherwise would), the user may select the option 420.

The GUI 400 may also include another section 430 at which other triggers may be selected to set or configure the apparatus to act in conformance with those other triggers (reduce the amplitude of the noise cancellation signals that are currently being output). Accordingly, the GUI 400 may include an option 432 to select someone speaking the user's name as a trigger, an option 434 to select someone directing speech at the user as a trigger, and an option 436 to select whitelisted people speaking (as detected via voice recognition, facial recognition, etc.) as a trigger. An input box may even be included on the GUI 400 for the end-user to enter the names of one or more people that are to be whitelisted as predetermined people for whom the amplitude of noise cancellation signals are to be reduced.

Before concluding, it is to be understood that although a software application for undertaking present principles may be vended with a device, present principles apply in instances where such an application is downloaded from a server to a device over a network such as the Internet. Furthermore, present principles apply in instances where such an application is included on a computer readable storage medium that is vended and/or provided by itself, where the computer readable storage medium is not a transitory signal and/or a signal per se.

It may now be appreciated that present principles provide, among other technical improvements, improved computer-based user interfaces that increase the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein.

What is claimed is:

1. An apparatus, comprising:

a processor system; and storage accessible to the processor system and comprising instructions executable by the processor system to cause the processor system to:

concurrently present, at a device, audio, first noise cancellation signals different from the audio, and second noise cancellation signals different from the audio and different from the first noise cancellation signals, the first noise cancellation signals associated with a source of sound;

receive input from one or more sensors;

based on the input, determine that the source of sound is within a threshold distance to the device;

identify, based on execution of beamforming, the source of sound as directing speech toward a user of the device; and based on the determination and the identification, reduce the amplitude of the first noise cancellation signals but not the amplitude of the second noise cancellation signals.

2. The apparatus of claim 1, wherein the instructions are executable to cause the processor system to:

based on the determination, stop, pause, and/or mute the audio.

3. The apparatus of claim 1, wherein the instructions are executable to cause the processor system to:

reduce the amplitude by one of: ceasing to present the first noise cancellation signals, reducing the amplitude from a first level to a second level lower than the first level, the second level being higher than zero.

4. The apparatus of claim 1, wherein the one or more sensors comprise at least first and second microphones on the device, and wherein the determination is made based on triangulation of the source of sound using input from the first and second microphones.

5. The apparatus of claim 4, comprising the device and the first and second microphones.

6. The apparatus of claim 1, wherein the one or more sensors comprise a wireless signal transceiver, and wherein the determination is made based on input from the wireless signal transceiver indicating the source of sound within the threshold distance.

7. The apparatus of claim 1, wherein the instructions are executable by the processor system to cause the processor system to:

receive first input from a first microphone and receive second input from a second microphone, the second microphone being different from the first microphone; and execute the beamforming using the first and second input to perform the identification.

8. The apparatus of claim 1, wherein the instructions are executable by the processor system to cause the processor system to:

based on the determination and the identification, increase the volume of ambient sound as presented at the device.

9. The apparatus of claim 1, wherein the instructions are executable by the processor system to cause the processor system to:

based on the determination and the identification, reduced the amplitude of the first noise cancellation signals for a threshold amount of time; and responsive to the threshold amount of time ending, increase the amplitude of the first noise cancellation signals back to a higher level used prior to the reduction.

10. The apparatus of claim 1, wherein the instructions are executable by the processor system to cause the processor system to:

determine that the source of sound is no longer directing speech toward the user; and responsive to the determination that the source of sound is no longer directing speech toward the user, increase the amplitude of the first noise cancellation signals back to a higher level used prior to the reduction.

11. The apparatus of claim 1, wherein the second noise cancellation signals cancel ambient sound.

12. The apparatus of claim 1, wherein the second noise cancellation signals cancel sound from one or more people different from the source of sound.

13. The apparatus of claim 1, wherein the device is a first device, and wherein the second noise cancellation signals cancel sound from a second device different from both the first device and the source of sound.

14. The apparatus of claim 1, wherein the instructions are executable by the processor system to cause the processor system to:

determine that the source of sound is the user's dog; and responsive to the determination that the source of sound is the user's dog, reduce the amplitude of the first noise cancellation signals.

15. The apparatus of claim 1, wherein the instructions are executable by the processor system to cause the processor system to:

present a graphical user interface (GUI) on a display, the GUI indicating one or more settings related to noise cancellation, the GUI comprising an option that is selectable a single time to set the processor system to, for multiple future instances, reduce the amplitude of noise cancellation signals based on future determinations that sources of sound are within the threshold distance and future identifications of sources of sound as directing speech toward the user.

16. A method, comprising:

concurrently presenting, at a device, audio, first noise cancellation signals different from the audio, and second noise cancellation signals different from the audio and different from the first noise cancellation signals, the first noise cancellation signals associated with a source of sound;

receiving input from one or more sensors;

based on the input, determining that the source of sound is within a threshold distance to the device;

identifying, based on execution of beamforming, the source of sound as directing speech toward a user of the device; and based on the determining and the identifying, reducing the amplitude of the first noise cancellation signals but not the amplitude of the second noise cancellation signals.

17. The method of claim 16, comprising:

reducing the amplitude by one of: ceasing to present the first noise cancellation signals, reducing the amplitude from a first level to a second level lower than the first level, the second level being higher than zero.

18. At least one non-transitory computer readable storage medium (CRSM), the at least one CRSM comprising instructions executable by a processor system to cause the processor system to:

concurrently present, at a device, audio, first noise cancellation signals different from the audio, and second noise cancellation signals different from the audio and different from the first noise cancellation signals, the first noise cancellation signals associated with a source of sound;

identify, based on execution of beamforming, the source of sound as directing speech toward a user of the device; and based on the identification, reduce the amplitude of the first noise cancellation signals but not the amplitude of the second noise cancellation signals.

19. The at least one of claim 18, wherein the instructions are executable to cause the processor system to:

reduce the amplitude by one of: ceasing to present the first noise cancellation signals, reducing the amplitude from a first level to a second level lower than the first level, the second level being higher than zero.

20. The at least one CRSM of claim 18, wherein the second noise cancellation signals cancel ambient sound.

* * * * *